United States Patent Office 3,086,018
Patented Apr. 16, 1963

3,086,018
MANUFACTURE OF AMINO THIAZOLE DISULFIDES
Albert F. Hardman, Northampton Township, Summit County, Ohio, assignor to The Goodyear Tire & Rubber Company, Akron, Ohio, a corporation of Ohio
No Drawing. Filed Dec. 24, 1957, Ser. No. 704,895
5 Claims. (Cl. 260—247.1)

This invention relates to amino azole disulfides and to a method of making these materials.

Amino azole disulfides are powerful accelerators of vulcanization of rubber. They can be used to promote the curing of rubber with or without sulfur. These materials are particularly useful in black tread stocks and other compositions containing rubber in which a powerful, yet delayed action, non-scorching accelerator is needed to promote the curing of the rubber.

The compounds with which this invention is concerned are the secondary amino azole disulfides. These compounds have the following general structure:

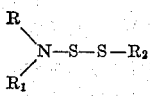

in which R and $R_1$ are the same or different aliphatic cycloaliphatic, or aralykyl groups or R and $R_1$ may together form a single ring or chain and $R_2$ represents a member of the class consisting of thiazoles, oxazoles and imidazoles.

According to this invention, amino azole disulfides are prepared by reacting an amine disulfide with an azyl disulfide in a solvent in the presence of an amine catalyst. The reaction appears to proceed according to the following equation in which dimethyl amine disulfide and 2,2'-bis(benzothiazyl) disulfide are used as representative starting materials.

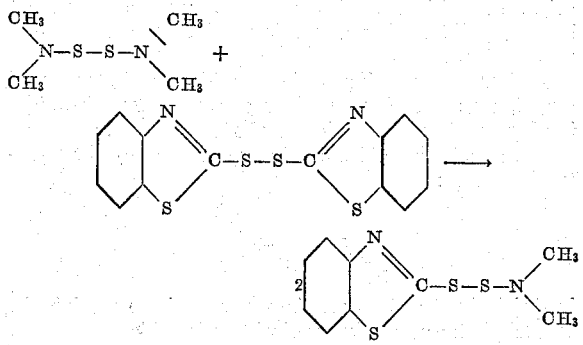

The practice and efficacy of the invention is illustrated by the following representative examples:

Example 1

Twelve grams of morpholine disulfide, 16 grams of 2,2'-bis (benzothiazyl) disulfide and 100 milliliters of ethyl alcohol were placed in a small flask set up with a reflux condenser and a stirrer. The slurry was stirred and refluxed for a short time. The materials did not go into solution in the alcohol. The mixture was cooled and filtered. The residue obtained was dried and the melting point determined and found to be 160 to 170° C. The melting point range for 2,2'-bis (benzothiazole) disulfide is 160 to 170° C.

Example 2

1.2 grams of morpholine disulfide, 1.7 grams of 2,2'-bis (benzothiazyl) disulfide, and 6 milliliters of benzene were placed in a small reaction flask and heated to boiling. The mixture did not dissolve in the benzene. Apparently no reaction occurred.

Example 3

Twelve grams of morpholine disulfide, 17 grams of 2,2'-bis (benzothiazyl) disulfide and 100 milliliters of isopropanol were placed in a small flask set up with a reflux condenser and a stirrer. The mixture was stirred and refluxed for seven hours. The solution was still not clear so the unreacted 2,2'-bis (benzothiazyl) disulfide was filtered off from the hot solvent and the filtrate was cooled. Crystals obtained from the filtrate were dried and a yield of 20 grams of 2-(4-morpholinyl dithio) benzothiazole having a melting point of 131–132° C. was obtained.

Example 4

Six grams of morpholine disulfide, 8.5 grams of 2,2'-bis (benzothiazyl) disulfide, 30 milliliters of benzene and 0.5 gram of morpholine were placed in a small flask and thoroughly mixed together. The slurry formed was allowed to stand at room temperature for one-half hour. There was no change in the appearance of the slurry during this period. The mixture was then heated and refluxed, the solids completely dissolving before refluxing temperature was reached. The solution was heated for 15 minutes, cooled and stirred. It set up to a mass of crystals and was then filtered and washed with cold benzene. A yield of ten grams of product having a melting point of 133–134° C. was obtained. The melting point of 2-(4-morpholinyl dithio) benzothiazole is 134 to 135° C.

Example 5

Twelve grams of morpholine disulfide, 17 grams of 2,2'-bis (benzothiazyl) disulfide, 100 milliliters of isopropanol, and 1 gram of morpholine (5.88% based on the weight of 2,2'-bis (benzothiazyl) disulfide used) were placed in a small flask set up with a reflux condenser and stirrer. The mixture was stirred and refluxed. The slurry cleared up in about 2½ hours. The solution obtained was cooled. The crystals which formed were filtered off, washed and dried. A yield of 24.5 grams of 2-(4-morpholinyl dithio) benzothiazole having a melting point of 131–132° C. was obtained.

Example 6

Twenty-four grams of morpholine disulfide, 34 grams of 2,2'-bis (benzothiazyl) disulfide, and 125 milliliters of isopropyl alcohol were placed in a small flask set up with a reflux condenser and stirrer. The mixture was stirred and refluxed for 10 to 15 minutes. There was no appreciable change in the slurry. One gram of morpholine was added and the mixture was refluxed for 15 minutes. There was still no appreciable change in appearance, so an additional 7 grams of morpholine were added (making a total of 8 grams of 23.47% based on the weight of 2,2'-bis (benzothiazyl)disulfide used). The slurry changed appearance and all of the material went into the solution in about 6 or 7 minutes. The solution was refluxed for 15 minutes additional time and then poured into a beaker and cooled. The mixture crystallized, becoming too thick to stir, so an additional 75 milliliters of isopropyl alcohol were added. The mixture was allowed to stand for 3 hours. The crystals which formed were filtered off, washed with 100 cc. of isopropyl alcohol and dried. There was obtained a yield of 52 grams of 2-(4-morpholinyl dithio) benzothiazole having a melting point of 133 to 134° C.

Example 7

Thirty-four grams of 2,2'-bis (benzothiazyl) disulfide, 24 grams of morpholine disulfide, 8.5 grams of morpholine (25.00% based on the weight of 2,2'-bis (benzothiazyl-disulfide used), as a catalyst, and 125 milliliters of ethanol were placed in an apparatus similar to that of Example 1. The mixture was stirred and refluxed for 20 to 30 minutes. It was then cooled and the crystalline product was separated from the solution by filtration. The product was washed with cold ethanol and dried. A yield of 53 grams of 2-(4-morpholinyl dithio) benzothiazole melting at 134–135° C. was obtained.

*Example 8*

Twelve grams of morpholine disulfide, 17 grams of 2,2'-bis (benzothiazyl) disulfide, 100 milliliters of isopropanol, and 6 grams of morpholine (35.28% based on the weight of 2,2'-bis benzothiazole disulfide used) were placed in a small three-neck flask set up with a stirrer and reflux condenser. The mixture was stirred and refluxed and the slurry cleared up in 6 minutes. It was refluxed for an additional 10 minutes, then cooled and the crystals which formed were filtered off, washed and dried. A yield of 27 grams of 2-(4-morpholinyl dithio) benzothiazole having a melting point of 133–134° C. was obtained.

*Example 9*

Seventeen grams of 2,2'-bis (benzothiazyl) disulfide, 8.5 grams of dithio-bis-(dimethylamine), 0.5 gram of morpholine, as a catalyst, and 50 milliliters of methanol were placed in a 500-milliliter 3-neck flask equipped with a stirrer and a reflux condenser. The mixture was stirred and refluxed for ½ hour. It was then cooled and the crystalline product was separated from the solution by filtration, washed with methanol and dried. A yield of 19 grams of 2-(dimethylamino dithio) benzothiazole melting at 70 to 71° C. was obtained.

*Example 10*

Thirty-three grams of 2,2'-bis (benzothiazyl) disulfide, 21 grams of dithio-bis-(diethylamine), 7.3 grams of diethylamine, as a catalyst, and 200 milliliters of methanol were placed in an apparatus similar to that of Example 1 and heated at refluxing temperature for one and one half hours. The alcohol solution was filtered, and water was added. The solution separated into an aqueous phase and an oil phase. The product, 2-(diethylamino dithio) benzothiazole, was obtained as an oily liquid in a yield of 32 grams.

*Example 11*

Thirty-three grams of 2,2'-bis (benzothiazyl) disulfide, 22 grams of N,N'-dithio-bis-piperidine, 8.5 grams of piperidine, as a catalyst, and 200 milliliters of methanol were placed in an apparatus similar to that of Example 1. The mixture was heated under reflux for a half hour, cooled and the crystalline product was separated from the solution by filtration. It was washed with methanol and dried. A yield of 41.5 grams of 2-(piperidyl dithio) benzothiazole melting at 84 to 85° C. was obtained.

*Example 12*

Twenty-four grams of morpholine disulfide, 34 grams of 2,2'-bis (benzothiazyl) disulfide and 60 milliliters of a methanol solution of ammonia containing 3.4 grams of NH₃ were placed in a small three-neck flask set up with a reflux condenser and stirrer. One hundred twenty-five milliliters of additional methanol were added. The mixture was stirred and heated at 60 to 62° C. The slurry, which was quite thin at first, became thick with crystals in one-half hour. After one and one-half hours, the slurry was cooled, the crystals were filtered off, washed with cold methanol and dried. A yield of 50 grams of 2-(4-morpholinyl dithio) benzothiazole having a melting point of 131 to 132° C. was obtained.

*Example 13*

Twenty-four grams of morpholine disulfide, 36 grams of 2,2'-bis (benzothiazyl) disulfide, 150 milliliters of isopropanol, and 1 gram of isopropyl amine were placed in a small flask set up with a reflux condenser and a stirrer. The mixture was stirred and refluxed. The slurry cleared in about one hour. It was refluxed for 2 hours longer, then cooled, and the crystals which formed were filtered off, washed and dried. A yield of 52.5 grams of 2-(4-morpholinyl dithio) benzothiazole), having a melting point of 125 to 126° C. was obtained.

*Example 14*

Twelve grams of morpholine disulfide, 17 grams of 2,2'-bis (benzothiazyl) disulfide, 100 milliliters of isopropanol, and 1 gram of cyclohexyl amine were placed in a small three-neck flask set up with a reflux condenser and stirrer. The mixture was stirred and refluxed and the slurry cleared up in about 2 hours. The solution obtained was cooled. The crystals which formed were filtered off, washed and dried. A yield of 26.5 grams of 2-(4-morpholinyl dithio) benzothiazole having a melting point of 133–134° C. was obtained.

*Example 15*

Twenty-four grams of morpholine disulfide, 35 grams of 2,2'-bis (benzothiazyl) disulfide, 150 milliliters of isopropanol, and 10 grams of triethyl amine were placed in a small flask set up with a reflux condenser and stirrer. The mixture was stirred and refluxed and became clear in 3 hours. The solution obtained was cooled. The crystals which formed were filtered off, washed and dried. A yield of 44 grams (77.5 percent of theory) of 2-(4-morpholinyl dithio) benzothiazole was obtained.

*Example 16*

Twelve grams of morpholine disulfide, 17 grams of 2,2'-bis (benzothiazyl) disulfide, 2 grams of piperidine and 100 milliliters of isopropanol were placed in a small three-neck flask set up with a reflux condenser and stirrer. The mixture was stirred and refluxed and became clear in about 20 minutes. It was refluxed for an additional 30 minutes, cooled and filtered. The solution was cooled. The crystals which formed were filtered off, washed and dried. A yield of 23 grams of 2-(4-morpholinyl dithio) benzothiazole having a melting point of 127–128° C. was obtained.

Various other amino azole disulfides can be prepared by using other amine disulfides and other azyl disulfides in place of those shown in the above examples.

The amine dissulfides can be represented by the structural formula:

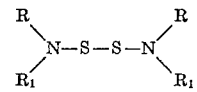

in which the R and R₁ are the same or different aliphatic, cycloaliphatic or aralkyl radicals or in which R and R₁ on one or both nitrogen atoms are joined to form a single ring. Thus included are the amine disulfides in which R and R₁ on a nitrogen atom form a closed chain, which can be interrupted by sulfur, oxygen or an imino group (>NH).

Representative amine disulfides are the bis-secondary amine disulfides such as:

N,N'-dithio-bis (dimethylamine)
N,N'-dithio-bis (diethylamine)
N,N'-dithio-bis (di-n-propylamine)
N,N'-dithio-bis (di-n-butylamine)
N,N'-dithio-bis-diisobutylamine
N,N'-dithio-bis (di-n-amylamine)
N,N'-dithio-bis (di-isoamylamine)
N,N'-dithio-bis (di-n-hexylamine)
N,N'-dithio-bis (di-n-heptylamine)
N,N'-dithio-bis (di-n-octylamine)
N,N'-dithio-bis (di-benzylamine)
N,N'-dithio-bis (methylcyclohexylamine)
N,N'-dithio-bis (ethylcyclohexylamine)

N,N'-dithio-bis (morpholine)
N,N'-dithio-bis (dicyclohexylamine)
N,N'-dithio-bis (thiomorpholine)
N,N'-dithio-bis (4-N-ethyl piperazine)
N,N'-dithio-bis (piperidine)
N,N'-dithio-bis (pyrrolidine)

Saturated straight chain hydrocarbon substituted amine disulfides and N,N'-dithio-bis (morpholine) and N,N'-dithio-bis (piperidine) constitute preferred species.

The azyl disulfides which can be used include the thiazyl disulfides, the oxazyl disulfides and the imidazyl disulfides. Both aromatic and aliphatic azyl disulfides can be used. Representative examples are:

2,2'-bis (thiazyl) disulfide
2,2'-bis (oxyazyl) disulfide
2,2'-bis (imidazyl) disulfide
2,2'-bis (4-methyl thiazyl) disulfide
2,2'-bis (4-methyl oxazyl) disulfide
2,2'-bis (4-methyl imidazyl) disulfide
2,2'-bis (4-ethyl thiazyl) disulfide
2,2'-bis (4-ethyl oxazyl) disulfide
2,2'-bis (4-ethyl imidazyl) disulfide
2,2'-bis (4-n-propylthiazyl) disulfide
2,2'-bis (4-n-propyloxazyl) disulfide
2,2'-bis (4-n-propylimidazyl) disulfide
2,2'-bis (4-n-butylthiazyl) disulfide
2,2'-bis (4-n-butyloxazyl) disulfide
2,2'-bis (4-n-butylimidazyl) disulfide
2,2'-bis (4,5-dimethylthiazyl) disulfide
2,2'-bis (4,5-dimethyloxazyl) disulfide
2,2'-bis (4,5-dimethylimidazyl) disulfide
2,2'-bis (4,5-diethylthiazyl) disulfide
2,2'-bis (4,5-diethyloxazyl) disulfide
2,2'-bis (4,5-diethylimidazyl) disulfide
2,2'-bis (4,5-di-n-propylthiazyl) disulfide
2,2'-bis (4,5-di-n-propyloxazyl) disulfide
2,2'-bis (di-n-propylimidazyl) disulfide
2,2'-bis (4-phenylthiazyl) disulfide
2,2'-bis (4-phenyloxazyl) disulfide
2,2'-bis (4-phenyl imidazyl) disulfide
2,2'-bis (4-phenyl-5-methylthiazyl) disulfide
2,2'-bis (4-phenyl-5-methoxazyl) disulfide
2,2'-bis (4-phenyl-5-methylimidazyl) disulfide
2,2'-bis (4-phenylbenzothiazyl) disulfide
2,2'-bis (4-phenylbenzoxazyl) disulfide
2,2'-bis (4-phenylbenzimidazyl) disulfide
2,2'-bis (4-chlorobenzothiazyl) disulfide
2,2'-bis (4-chlorobenzoxazyl) disulfide
2,2'-bis (4-chlorobenzimidazyl) disulfide
2,2'-bis (6-chlorobenzothiazyl) disulfide
2,2'-bis (6-chlorobenzoxazyl) disulfide
2,2'-bis (6-chlorobenzimidazyl) disulfide
2,2'-bis (benzothiazyl) disulfide
2,2'-bis (benoxazyl) disulfide
2,2'-bis (benzimidazyl) disulfide
2,2'-bis (tetrahydrobenzothiazyl) disulfide
2,2'-bis (tetrahydrobenzoxazyl) disulfide
2,2'-bis (tetrahydrobenzimidazyl) disulfide
2,2'-bis (naphthothiazyl) disulfide
2,2'-bis (naphthooxazyl) disulfide
2,2'bis (naphthoimidazyl) disulfide The bis (benzothiazyl) disulfides and particularly 2,2'-bis-(benzothiazyl) disulfide are preferred materials.

Various organic solvents can be used in the process of this invention. Representative examples of such solvents are benzene, toluene, xylene, ethylene dichloride, chloroform, chlorobenzene, and the lower aliphatic alcohols such as methanol, ethanol, isopropanol, normal propanol and normal butanol. The lower aliphatic alcohols are preferred and of these isopropanol is the most preferred.

Ammonia and amines more basic than ammonia can be used as catalysts for the process of this invention. Aliphatic, cycloaliphatic, aralkyl, mixed aliphatic-cycloaliphatic, mixed aliphatic-aralkyl and mixed cycloaliphatic-aralkyl amines can be used. Examples 5, 6, 7, and 8 illustrate the effect of increasing the catalyst concentration. Increased yields were obtained and the reaction time was decreased when larger amounts of catalyst were used. Thus, in Example 5 wherein the catalyst concentration was 5.88% by weight based on the weight of 2,2'-bis(benzothiazyl)disulfide a yield of 85% of 2-(4-morpholinyl dithio) benbothiazole was obtained in 2½ hours. In Example 8 wherein the catalyst concentration based on the 2,2'-bis(benzothiazole)disulfide was 35.28% a yeild of 93.7% was obtained in 16 minutes reaction time. Thus it is seen that the catalyst concentration can be varied over a wide range, from 1% to 50% can be used, the preferred range being from 5% to 35% based on the 2,2'-bis (benzothiazole) disulfide used. Primary, secondary, and tertiary amines can be used. Representative examples of these catalysts are ammonia, primary amines such as methyl amine, (ethyl amine, n-propyl amine, isopropyl amine, n-butyl amine, sec-butyl amine, tertiary butyl amine, the amyl amines, cyclohexylamine and benzylamine, secondary amines such as dimethyl amine, diethyl amine, di-n-propyl amine, diisopropyl amine, di-n-butyl amine, methylethyl amine, methyl-n-propyl amine, ethyl-n-propyl amine, methylcyclohexyl amine, dibenzylamine, cyclohexyl-benzyl amine morpholine, piperidine and tertiary amines such as trimethyl amine, tri-n-propyl amine, tri-n-butyl amine, methyl diethyl amine, methyl di-n-propyl amine, ethyl di-n-butyl amine and methyl dibenzyl amine. While various amines can be used as catalyst, it is usually most convenient to employ the amine corresponding to the amine radical of the amine sulfide used in the reaction.

The reactions of the above examples were all carried out at about the refluxing temperature of the mixture. Lower temperatures can be used, but the time of reaction then must be increased to get complete reaction. The temperature is not critical, but it is desirable to use a temperature that will give reasonably fast reaction rates so that the process may be economically carried out. For most efficient use of the reactants, one mol of the amine disulfide is used to one mol of the azyl disulfide, although an excess of either reactant can be present, if desired.

While certain represenative embodiments and details have been shown for the purpose of illustrating the invention, it will be apparent to those skilled in this art that various changes and modifications may be made therein without departing from the spirit or scope of the invention.

This application is a continuation-in-part of application Serial No. 458,007, filed September 23, 1954, now abandoned.

We claim:

1. The method which comprises reacting (a) an amine disulfide conforming to the general formula

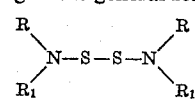

in which R and $R_1$ are radicals selected from the group consisting of a cyclohexyl radical, benzyl, alkyl radicals containing from 1–8 carbon atoms, and radicals in which R and $R_1$ together on a nitrogen atom are joined to form a closed ring selected from the group consisting of morpholine, thiomorpholine, piperazine, piperidine and pyrrolidine and (b) a thiazyl disulfide selected from the group consisting of 2,2'-bis(thiazyl)disulfide, 2,2'-bis(thiazyl)-disulfides having substituents selected from the group consisting of phenyl and alkyl radicals containing from 1–4 carbon atoms, and aromatic thiazyl disulfides selected from the group consisting of 2,2'-bis(4-phenyl benzothiazyl)disulfide, 2,2'-bis(tetrahydrobenzothiazyl)disulfide, 2,2'-bis(naphthothiazyl)disulfide, 2,2'-bis(4-chlorobenzothiazyl)disulfide, 2,2'-bis-(6-chlorobenzothiazyl)disulfide and 2,2'-bis(benzothiazyl)disulfide in an organic solvent in the presence of from 1 to 50% by weight, based on the weight of thiazyl disulfide used in the reaction, of a catalyst selected from the group consisting of ammonia and primary, secondary and tertiary lower alkyl amines, cyclohexylamine, benzylamine, dibenzylamine, methyl-cyclohexylamine, cyclohexylbenzylamine, morpholine, piperidine and methyldibenzylamine, the amine disulfide and the thiazyl disulfide being used in approximately equal molar proportions.

2. The method of preparing 2-(4-morpholinyldithio) benzothiazole which comprises reacting approximately equal molar proportions of N,N'-dithio-bis(morpholine) and 2,2'-bis(benzothiazyl)disulfide in an alcohol selected from the group consisting of methanol, ethanol, isopropanol, normal propanol and normal butanol in the presence of from 5 to 35% by weight of morpholine, based on the weight of 2,2'-bis(benzothiazyl)disulfide used.

3. The method of preparing 2-(4-morpholinyldithio) benzothiazole which comprises reacting approximately equal molar proportions of N,N'-dithio-bis-(morpholine) and 2,2'-bis-(benzothiazyl)disulfide in isopropanol in the presence of 35% by weight of morpholine, based on the weight of 2,2'-bis(benzothiazyl)disulfide used.

4. The method of preparing 2-diethylamino dithio) benzothiazole which comprises reacting approximately equal molar proportions of N,N'-dithio-bis-(diethylamine) and 2,2'-bis-(benzothiazyl)disulfide in methanol in the presence of approximately 22% by weight of diethylamine, based on the weight of 2,2'-bis-(benzothiazyl)disulfide used.

5. The method of preparing 2-(piperidyl dithio)benzothiazole which comprises reacting approximately equal molar proportions of N,N'-dithio-bis-piperidine and 2,2'-bis(benzothiazyl)disulfide in methanol in the presence of approximately 25% by weight of piperidine, based on the weight of 2,2'-bis(benzothiazyl)disulfide used.

References Cited in the file of this patent

UNITED STATES PATENTS

| | | |
|---|---|---|
| 2,474,849 | Kleiman | July 5, 1949 |
| 2,510,894 | Kleiman | June 6, 1950 |
| 2,610,968 | Kleiman | Sept. 16, 1952 |
| 2,730,527 | Kinstler | Jan. 10, 1956 |
| 2,747,005 | Zerbe | May 22, 1956 |
| 2,835,670 | Hardman | May 20, 1958 |
| 2,850,496 | Hardman | Sept. 2, 1958 |